| United States Patent [19] | [11] Patent Number: 5,007,521 |
| Tanaka | [45] Date of Patent: Apr. 16, 1991 |

[54] METHOD FOR MERGING GOODS AND APPARATUS THEREFOR

[75] Inventor: Nobuhiro Tanaka, Miyashiromachi, Japan

[73] Assignee: Kao Corporation, Tokyo, Japan

[21] Appl. No.: 555,782

[22] Filed: Jul. 23, 1990

Related U.S. Application Data

[63] Continuation of Ser. No. 344,497, Apr. 27, 1989, abandoned, which is a continuation of Ser. No. 78,394, Jul. 24, 1987, abandoned.

[30] Foreign Application Priority Data

Jul. 24, 1986 [JP] Japan ................... 61-174265
Jul. 24, 1986 [JP] Japan ................... 61-174266
Jul. 24, 1986 [JP] Japan ................... 61-174267

[51] Int. Cl.$^5$ ................................ B65G 1/00
[52] U.S. Cl. ..................... 198/347.4; 198/347.1; 198/448; 414/398; 364/478
[58] Field of Search ............ 198/347.1, 347.4, 447, 198/448, 357, 781; 414/398; 364/478

[56] References Cited

U.S. PATENT DOCUMENTS

| 3,118,549 | 1/1964 | Hoellen ........................ 198/347 |
| 3,122,231 | 2/1964 | Pence et al. ................... 198/347 |
| 3,173,557 | 3/1965 | Eliassen ........................ 198/347 |
| 3,181,713 | 5/1965 | Abbe et al. .................... 198/347 X |
| 4,240,538 | 12/1980 | Hawkes et al. ................. 198/447 X |
| 4,499,987 | 2/1985 | Long ............................. 198/347 |
| 4,534,462 | 8/1985 | Hoover et al. ................. 198/781 |
| 4,562,920 | 1/1986 | Jaffre ............................ 198/781 |
| 4,609,091 | 9/1986 | Dorner .......................... 198/347 |
| 4,615,446 | 10/1986 | Pavic ........................... 198/347 X |
| 4,618,341 | 10/1986 | Oldham et al. ................. 198/347 X |
| 4,835,702 | 5/1989 | Tanaka ......................... 414/398 X |

FOREIGN PATENT DOCUMENTS

| 51-20358 | 2/1976 | Japan . |
| 51-151954 | 12/1976 | Japan . |
| 54-61763 | 5/1979 | Japan . |
| 55-89126 | 7/1980 | Japan . |
| 58-23294 | 6/1983 | Japan . |
| 58-27167 | 7/1983 | Japan . |
| 59-69314 | 4/1984 | Japan . |

Primary Examiner—H. Grant Skaggs
Assistant Examiner—James R. Bidwell

[57] ABSTRACT

There is disclosed a method for merging goods which are stored on a plurality of storage lines, including the steps of continuously forming a unit of goods each unit including a plurality of different items which are loaded generally over the entire length of each storage line, carrying out the unit of goods from each of the storage lines after the plurality of items have been stored on each storage line, storing the goods on each of the storage lines after the goods have been counted, and changing the speed of carrying out of goods from each storage line according to the sizes of the goods. An apparatus for carrying out the method is also disclosed.

5 Claims, 16 Drawing Sheets

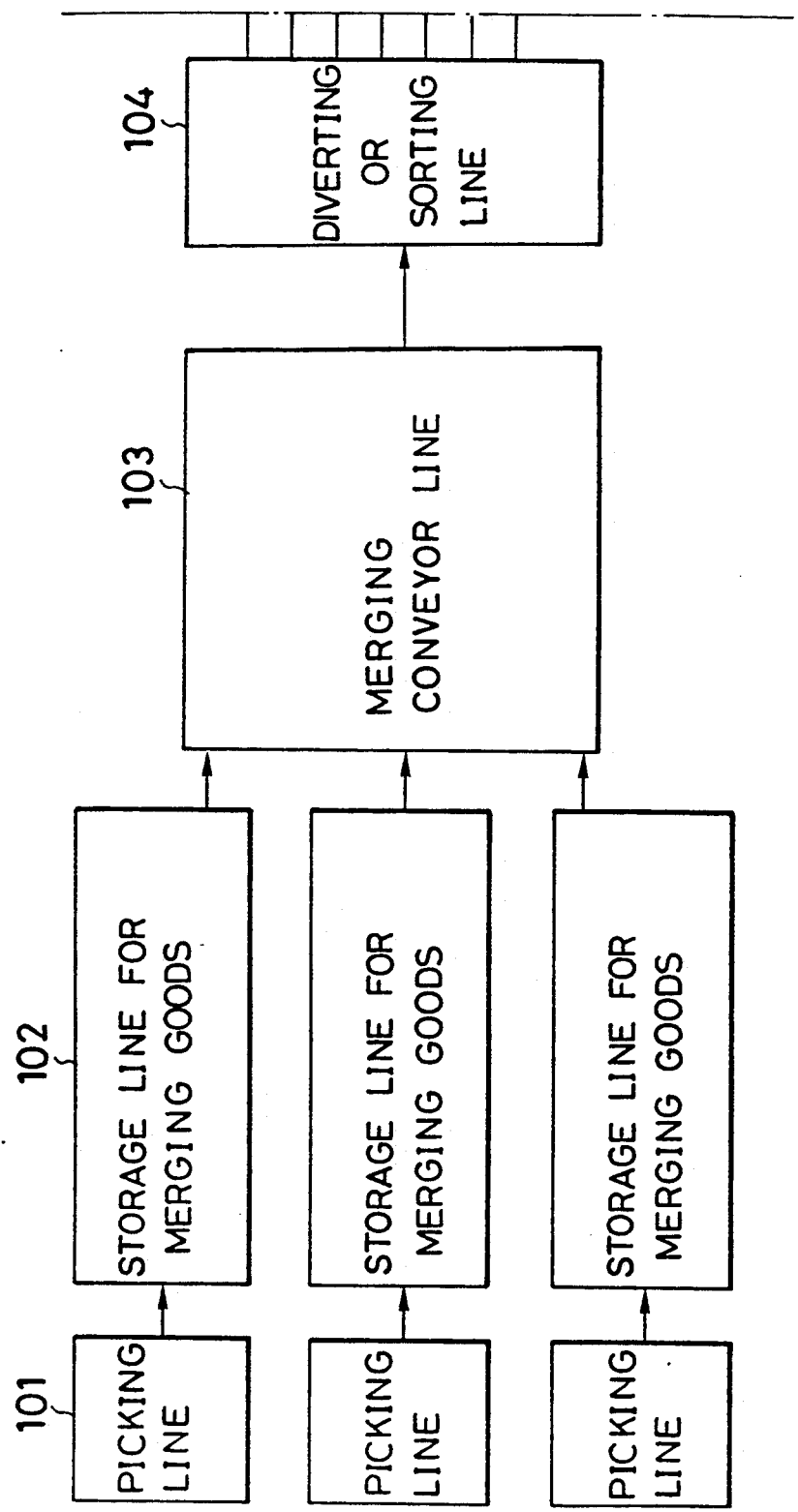

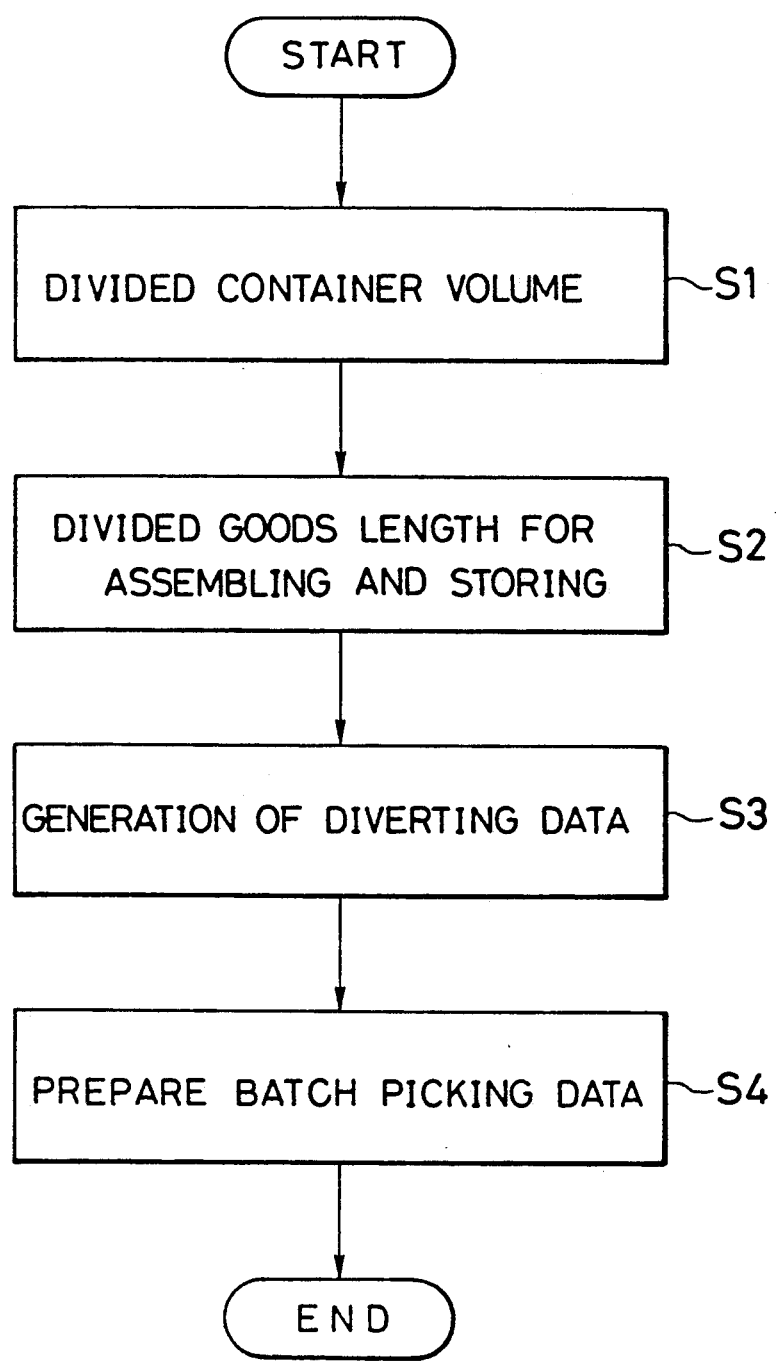

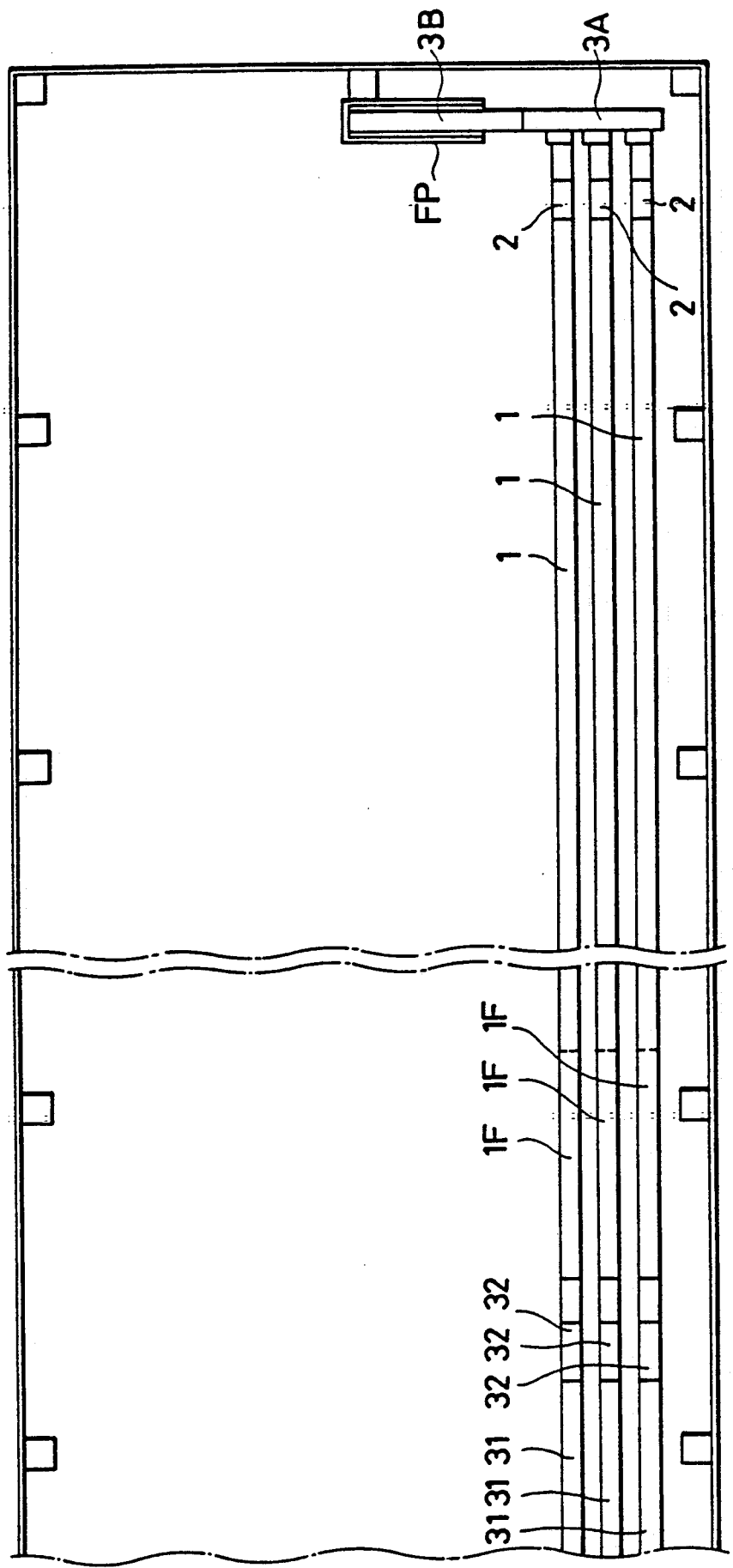

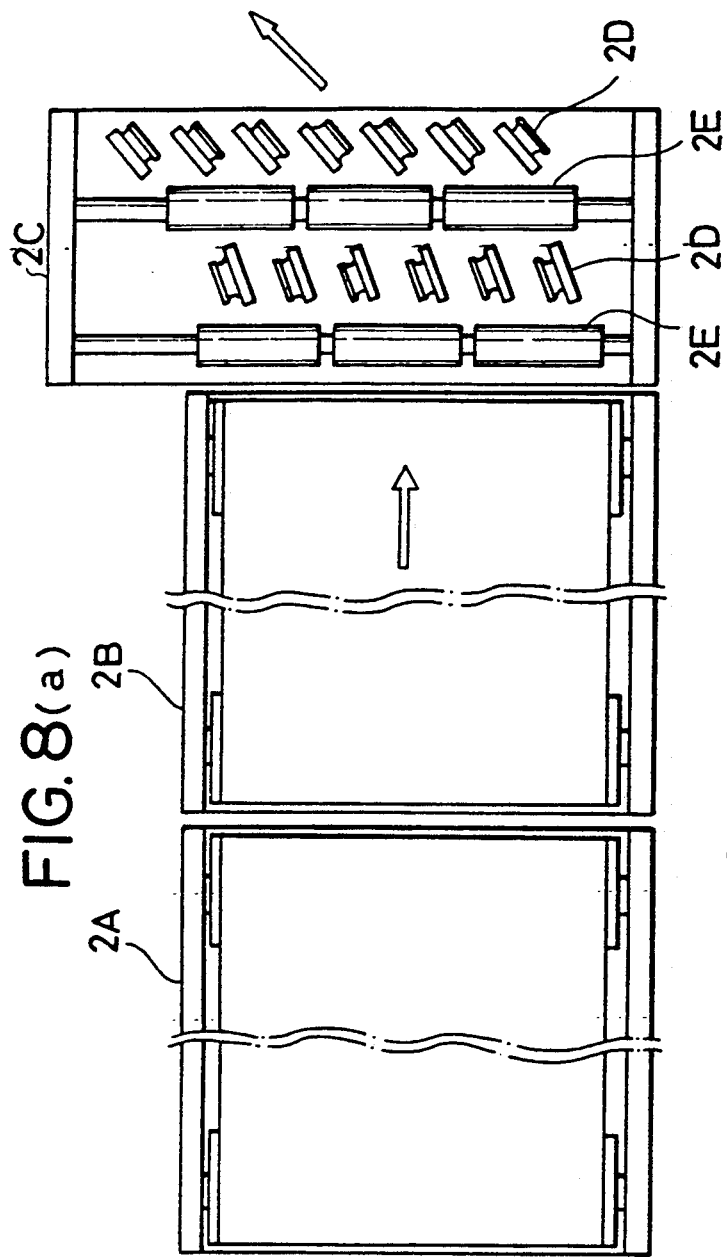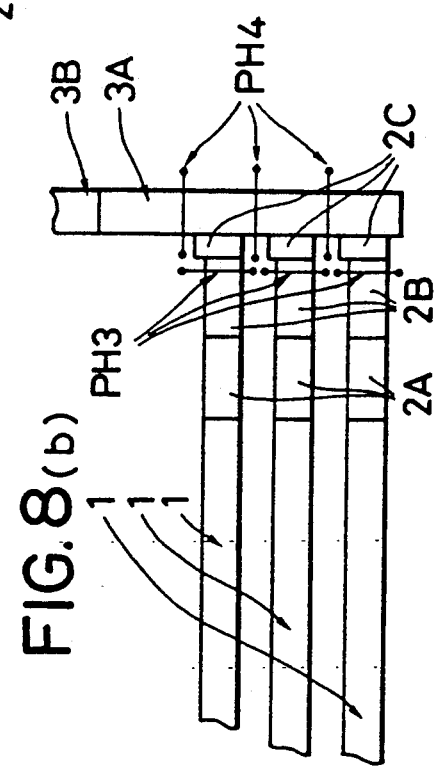

(a)

A: PH1···LIGHT TO SHADE    PH2···LIGHT TO ENTER
B: PH1···LIGHT TO SHADE    PH2···LIGHT TO SHADE
C: PH1···LIGHT TO ENTER    PH2···LIGHT TO SHADE

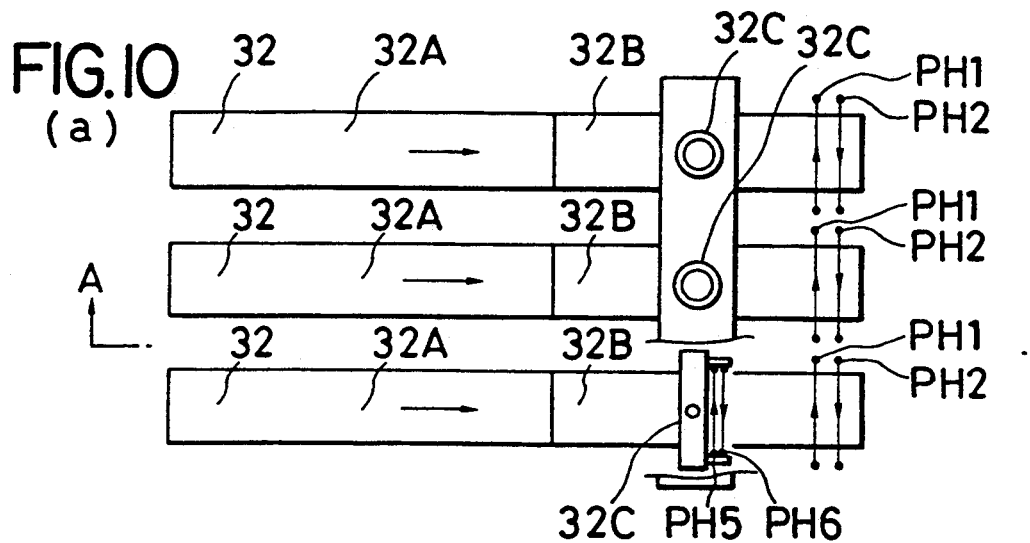
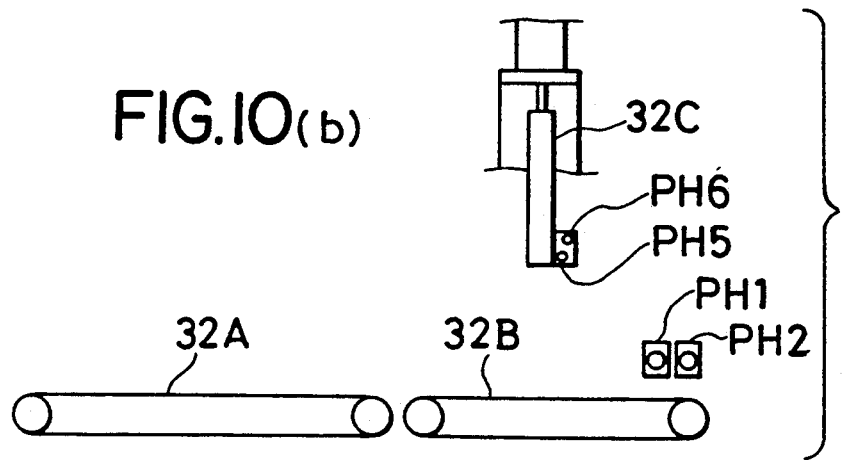
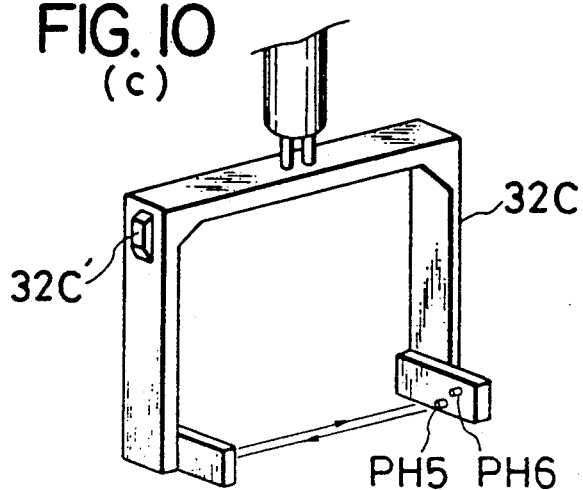
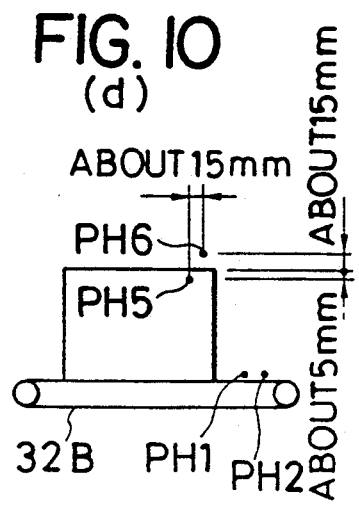

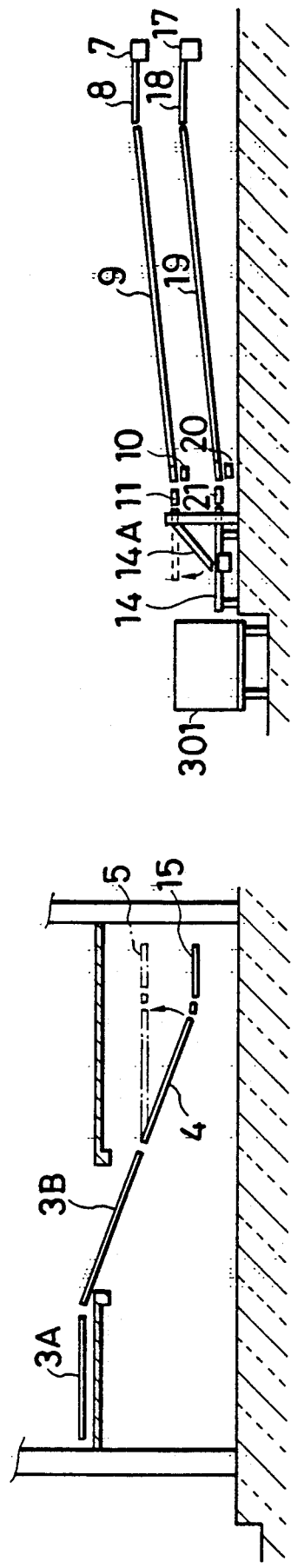

(a)

(b)

METHOD FOR MERGING GOODS AND APPARATUS THEREFOR

This application is a continuation of application Ser. No. 07/344,497 filed Apr. 27, 1989, now abandoned, which is a continuation of application Ser. No. 07/078,394, filed July 24, 1987 now abandoned.

BACKGROUND OF THE INVENTION

(1) Field of the Invention

This invention relates to a method for merging goods and an apparatus for carrying out the method. Particularly, it relates to a method for merging goods and an apparatus therefor, wherein switching time loss for merging goods is reduced and merging capacity is increased by reducing the frequency of switching for merging goods, counting errors are reduced and merging capacity is increased by counting the goods before they are transferred on a storage line (line on which goods are temporarily stored before merged), and merging capacity (number of goods/time) is maintained generally at a constant level irrespective of the sizes of goods by setting a space between adjacent goods generally constant, the goods being conveyed after being merged.

(2) Description of the Prior Art

A conventional method for merging goods and an apparatus therefor are described, for example, in Japanese patent publication No. 58-23294, Japanese patent early laid-open publication No. 51-20358, Japanese patent early laid-open publication No. 51-151954, and Japanese patent early laid-open publication No. 59-69314.

The above publications will now be briefly described. Japanese patent publication No. 58-23294 discloses the art in which in order to obtain a good balancing of the arrangement of goods which are to be transferred to a main stream conveyor from various branch stream conveyors, the goods are carried out starting from those on a downstream side branch stream conveyor and ending with those on an upstream side conveyor, and thereafter goods are carried out starting from those on an upstream side branch stream conveyor and ending to those on a downstream side branch stream conveyor.

Japanese patent early laid-open publication No. 51-20358 discloses the art in which the priority of carrying-out goods (i.e., the order of goods to be carried out) is established according to instructions from a goods carry-out port, a conveying order of rows of goods is established from such established priority regarding the carrying-out of goods and the loading state of a conveyor, and the goods are then forwarded on the conveyor through various goods inlet ports based on such established-conveying order of the rows of goods.

Japanese patent early laid-open publication No. 51-151954 discloses the art in which after it is detected that all goods merged on a main conveyor line have passed the merging point at the most downstream side waiting conveyor line of a plurality of waiting conveyor lines where goods to be conveyed are waiting, the succeeding goods are merged.

Japanese patent early laid-open publication No. 59-69314 discloses the art in which when a stopper opening-and-closing sequence of a subline is built in a memory unit provided with a subline number in the direction of a data inlet/outlet line and with a tact in the address direction, an area of the memory unit is diagonally allocated to form diagonal tacts, the diagonal tacts each necessarily including only a stopper open information "1" of one subline, the stoppers of the remaining sublines all including a close information "0", in this way, the contents of open/close memory of a subline being arranged in the memory unit comprising a shift registor, etc., goods being transferred on a main line by opening or closing the stoppers which are each disposed at an outlet port of each subline according to the stopper open-and-close informations which are arranged as described previously.

However, the above-described conventional methods for merging goods and apparatuses therefor have the following problems.

That is, in the above-described publications, in the case goods are in the front end portion of the storage line for merging goods or merging line, all goods or a predetermined quantity of goods on the storage line are carried out and merged in the predetermined order (carring-out action is not necessarily started after goods have filled the whole space on the storage line along its entire length). Accordingly, the frequency of switching action for merging is large, thus preventing a high merging capacity.

In Japanese patent publication No. 58-23294 and Japanese patent early laid-open publication No. 51-20358, since the goods are counted in the vicinity of the merging portion, the speed for conveying goods at the merging portion is limited depending on the counting capacity. That is, if goods, which are being conveyed at a high speed, are to be counted, there often occur such counting errors as that same goods are counted twice or two goods are counted as one due to swaying (dancing). In the case where the goods are to be counted in the vicinity of the merging portion, incorrectly-counted goods are conveyed to the succeeding line via the merging conveyor line without correcting the counting errors. Therefore, in the case where the succeeding line is, for example, a diverting line, there sometimes occur such instances where goods are forwarded to a wrong assembly/storage line. In Japanese early laid-open publication No. 51-151954 and Japanese early laid-open publication No. 59-69314, goods are carried out one by one (in the case goods are carried out one by one, the loss time for switching goods for merging is large). In addition, there is no description nor suggestion that goods are counted.

Furthermore, none of the above-described publications describe and/or suggest the speed with which goods are carried out from the storage line. Therefore, in the case where goods having various sizes are conveyed at a constant carry-out speed, the conveying spaces between adjacent merged-goods becomes irregular. Therefore, when goods must be supplied to the succeeding line with more than a predetermined space maintained between adjacent goods, the speed for carrying out goods must be set considering the smallest goods. The result is that when large goods are conveyed, a large space more than neccessary is formed between adjacent goods and high merging capacity is unobtainable.

SUMMARY OF THE INVENTION

Accordingly, a first object of the present invention is to provide a method for merging goods and an apparatus therefor, in which goods are efficiently and rapidly merged by reducing a time loss which often takes place when a switching action for merging goods is performed, even in the case where various kinds of goods having different sizes are merged.

A second object of the present invention is to provide a method for merging goods and an apparatus therefor, in which goods are efficiently and rapidly merged by preventing a counting error for goods to be conveyed and merging the goods at a high spped.

A third object of the present invention is to provide a method for merging goods and an apparatus therefor, in which goods are efficiently and rapidly merged by maintaining a generally constant space between adjacent goods which are being conveyed after being merged.

The above-mentioned first object of the present invention is acheived by providing a method for merging goods which are stored on a plurality of storage lines, comprising the steps of continuously forming a unit of merged goods comprising each amount of goods which are stored generally over the entire length of each storage line, and carrying out the goods from each of the storage lines after the unit of merged goods have been stored on each storage line.

In order to carry out the method for achieving the first object of the present invention, there is provided an apparatus for merging goods which are stored on a plurality of storage lines, comprising a storage conveyor having a sufficient length for storing a predetermined number of goods forming a unit of merged goods which are consecutively carried out, a carry-out conveyor for separately carrying out the goods one by one which are stored on the storage conveyor, a merging conveyor for carrying the carried-out goods, and a control system for forming said unit of merged goods.

The second object of the present invention is achieved by providing a method for merging goods which are stored on a plurality of storage lines, comprising the steps of storing the goods on each of the storage lines after the goods have been counted.

In order to carry out the method for achieving the second object of the present invention, there is provided an apparatus for merging goods which are stored in a plurality of storage lines, comprising a counting apparatus for counting the goods, and a storage conveyor for temporarily storing the goods, the counting apparatus separating and counting the goods one by one.

The third object of the present invention is achieved by providing a method for merging goods which are stored on a plurality of storage lines, comprising the step of changing the speed of carrying out goods from each storage line according to the sizes of the goods.

In order to carry out the method for achieving the third object of the present invention, there is provided an apparatus for merging goods which are stored on a plurality of storage lines, comprising a speed changing apparatus for changing the speed of carrying out goods to a carry-out conveyor from each storage line.

BRIEF DESCRIPTION OF THE DRAWINGS

Still other objects, features and advantages of the present invention will become readily apparent to those skilled in the art from the following detailed description, taken in consideration of the accompanying drawings, wherein:

FIG. 3 is a flow chart showing the steps for preparing controlling data for a sorting apparatus thereof;

FIG. 4 (B) is a schematic sectional view taken along line A—A of FIG. 4 (A);

FIG. 6 is a plan view schematically showing one embodiment of an apparatus for merging goods according to the present invention;

FIG. 7 (B) is a side view showing, in principle, the important part of the storage conveyor;

FIG. 8 (A) is a partly omitted generally plan view showing the carry-out conveyor thereof in detail;

FIG. 8 (B) is a plan view schematically showing the carry-out conveyor and a merging conveyor thereof;

FIG. 9 (B) is a side view thereof;

FIG. 9 (C) is a schematic view for explaining the action thereof;

FIG. 10 (A) is a plan view showing another example of the counting apparatus;

FIG. 10 (B) is a side view thereof;

FIG. 10 (C) is a perspective view of an apparatus for checking the items of goods thereof;

FIG. 10 (D) is a schematic view for explaining the action thereof;

FIG. 11 (B) is a sectional view taken along line A—A of FIG. 11 (A);

FIG. 11 (C) is a side view taken along line B—B of FIG. 11 (A);

FIG. 12 (B) is a front view thereof;

FIG. 13 (B) is a sectional view taken along line A—A of FIG. 13 (A); and

DETAILED DESCRIPTION OF THE PREFERRED EMBODIMENT

The present invention will now be described with reference to the accompanying drawings.

Figure 1B:
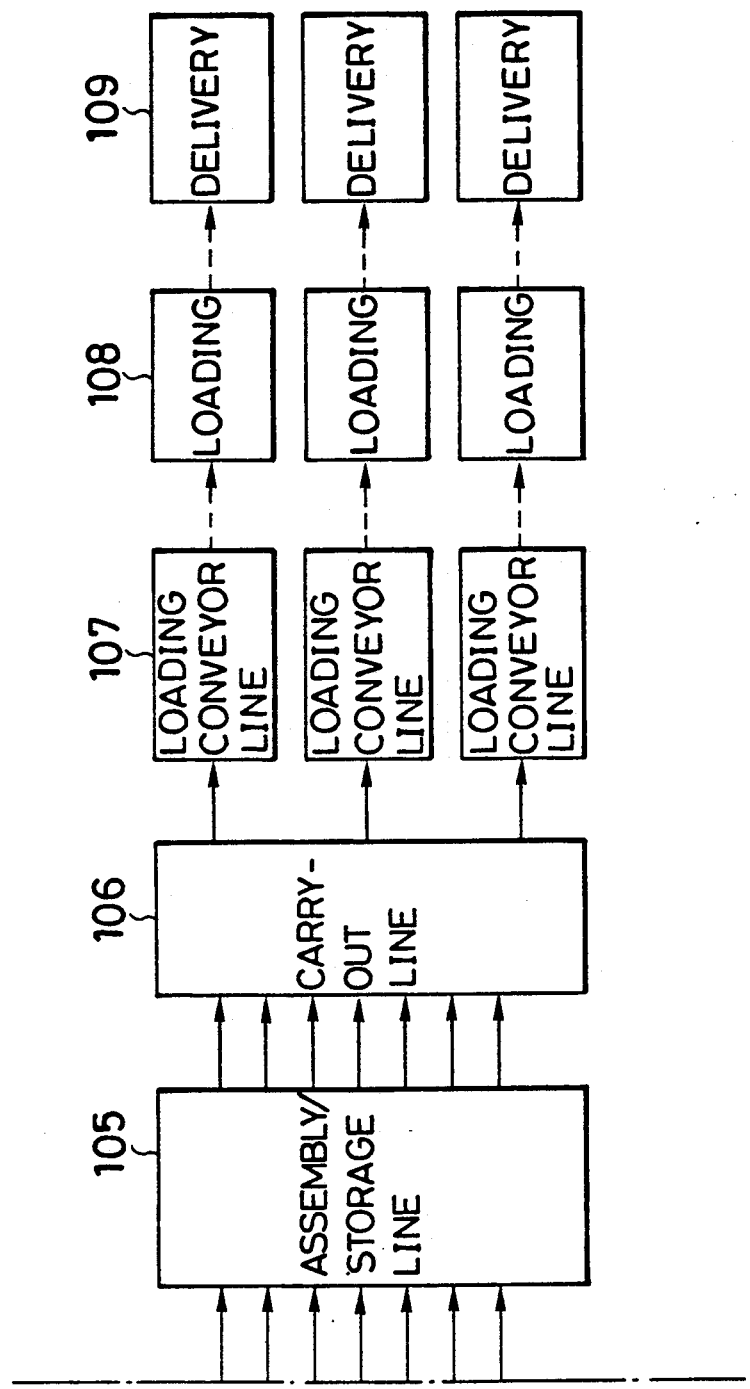
FIG. 1 is a block diagram showing one example of a physical distribution system to which one embodiment of a method for merging goods according to the present invention is applied.

FIG. 1 is a block diagram showing one example of a physical distribution system to which a method for merging goods according to the present invention is applied. In the figure, 101 denotes a picking line wherein goods are picked up by a picking apparatus as one lot of the same item of goods based on a predetermined batch picking data. Element 102 denotes a storage line wherein goods conveyed from the picking line 101 are temporarily stored and taken out as one lot of a predetermined amount of goods to be forwarded to a line to follow based on the batch picking data. Element 103 denotes a merging conveyor line where goods arrive from each storage line 102 starting from the line on which a predetermined number of goods have been loaded to merge with goods from other lines based on the batch picking data. Element 104 denotes a diverting or sorting line wherein goods are divided and sorted into a plurality of groups based on the diverting data or sorting group data which have been prepared beforehand according to the predetermined dimensions for one assembly of goods. Element 105 denotes an assembly/storage line on which such diverted goods are temporarily stored. Element 106 denotes a carry-out line wherein the goods are carried out from each assembly/storage line 105 in the unit of a container when a container identification number (truck number) is specified. Element 107 denotes a loading conveyor line wherein the carried-out goods are transferred to the loading stations. Element 108 denotes loadings and element 109 denotes deliveries. The whole system from the picking line 101 to the loading conveyor line 107 is automatically controlled by a computer.

Figure 2:
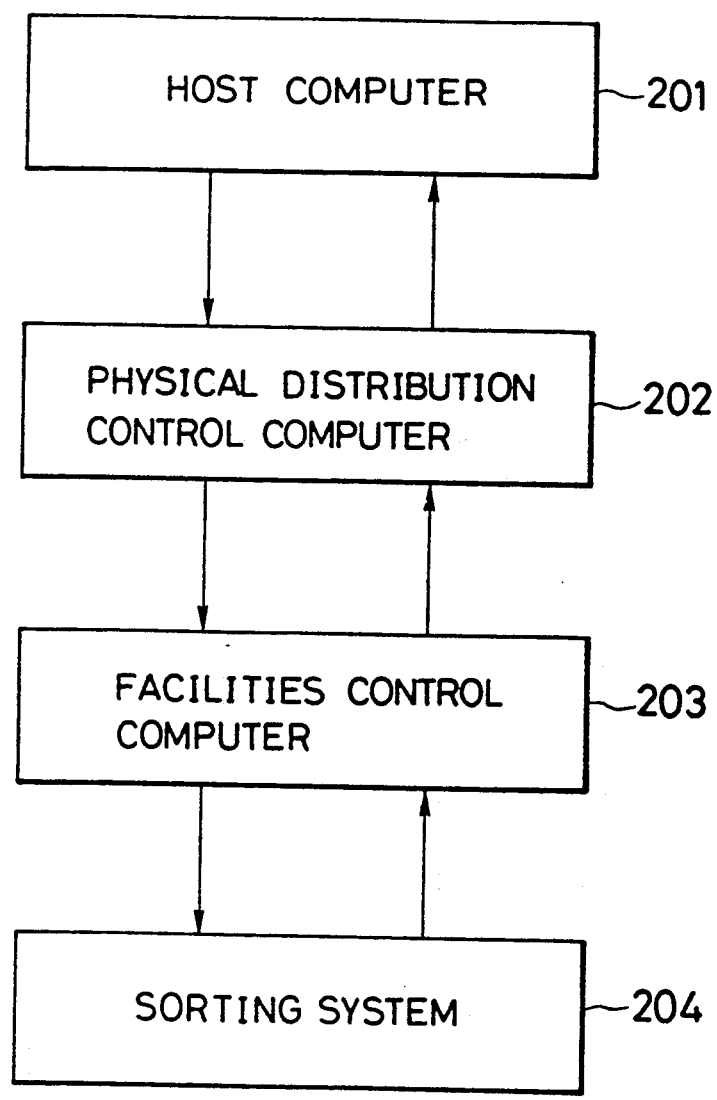
FIG. 2 is a block diagram showing a control system thereof.

FIG. 2 denotes a block diagram showing one example of a control system which is controlled by a computer. This control system comprises a host computer (central processing unit) 201, a physical distribution control computer 202, a facilities control computer 203 and a sorting system 204.

The host computer (CPU) 201 controls the physical distribution system as a whole. For example, it prepares a schedule for delivery based on the data of received-orders, and outputs the schedule to a downstream physical distribution control computer 202. The physical distribution control computer 202 determines groups of goods based on the delivery schedule, prepares diverting data and batch picking data, and outputs the data to the facilities control computer 203. The facilities control computer 203 prepares the required control commands based on the diverting and batch picking data, and outputs them to the sorting system 204. The sorting system 204 controls the merging, diverting and carrying-out of the goods with a sequencer.

The physical distribution control computer 202 in the control system prepares required data, which will be described hereinafter, according to the flow chart of FIG. 3. The detail thereof will be described with reference to a case in which goods are divided in five groups or lots for loading on a container as shown in FIG. 4. FIG. 4 (A) is a schematic plan view showing an important part of a sorting system which constitutes the physical distribution system of FIG. 1, and FIG. 4 (B) is a schematic sectional view taken along line A—A of FIG. 4 (A). In these figures, 301 denotes a container on which goods are to be loaded, 302 denotes a container loader, 303 denotes assembly/storage lines, and 304 denotes a diverting line. The assembly/storage lines 303 and the diverting line 304 are provided in two layers. Element 303-1 denotes an assembly/storage line from which goods are now being carried to a container, and 303-2 denotes another assembly/storage line on which goods are now being sorted. In these figures, the goods are expressed by tiny square marks corresponding to the dimensions of the various goods.

(Step S1): A container volume is divided into a plurality of sections.

Figure 4A:
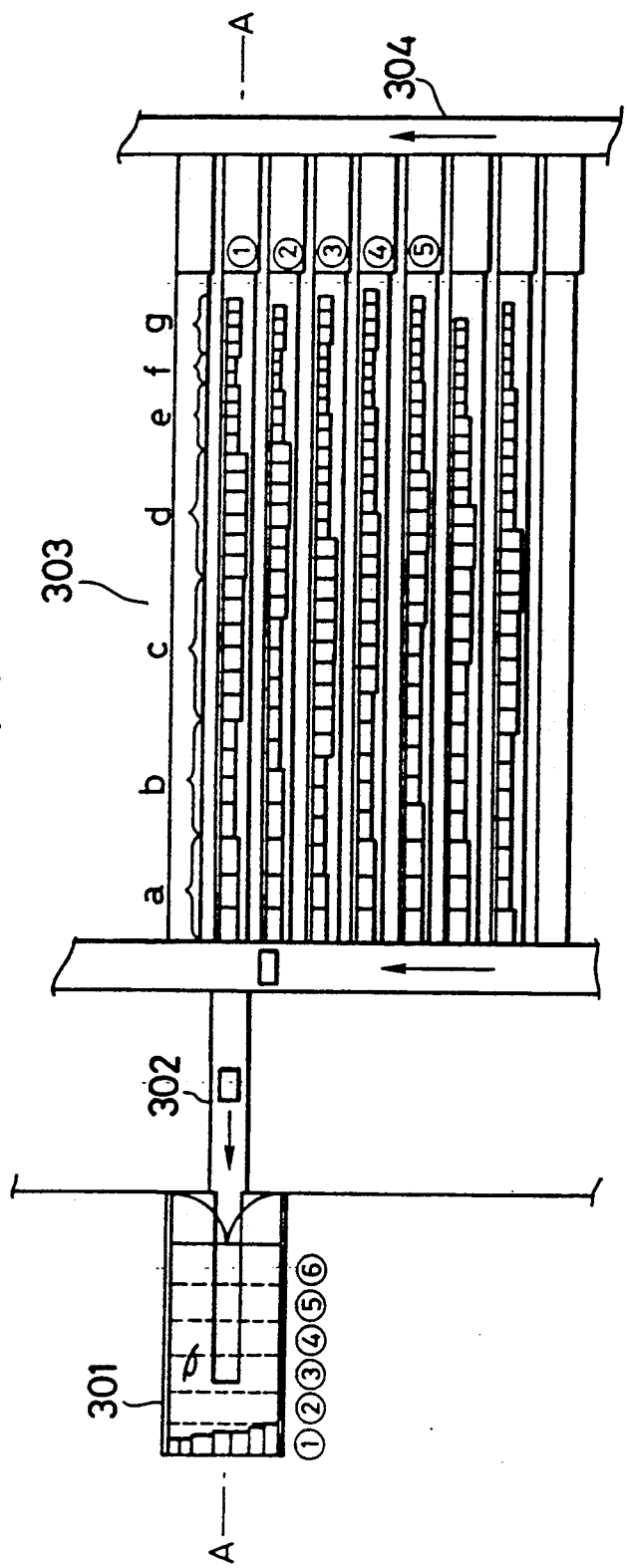
FIG. 4 (A) is a schematic plan view showing an important part of the sorting apparatus.
Figure 4B:
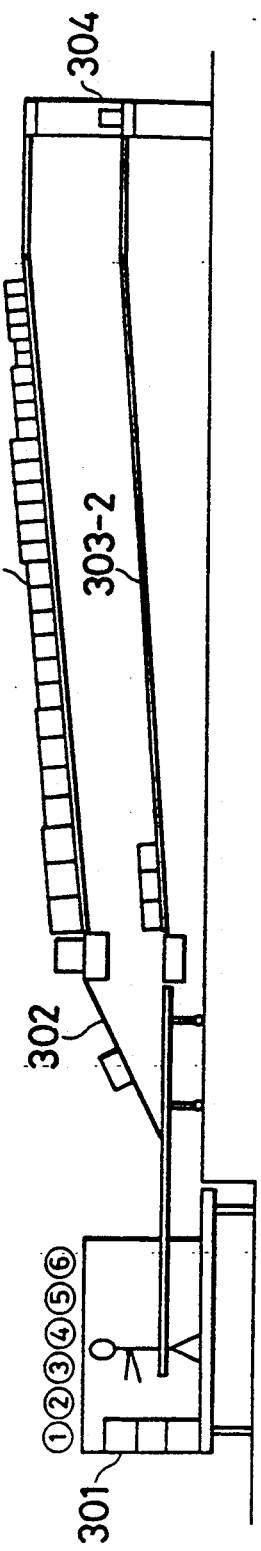

In the examples of FIGS. 4(A) and 4(B), the volume of a container (body of a delivery truck) 301 is divided into six sections as denoted by (1), (2), (3), (4), (5), and (6). That is, as the container 301 is of the type having a door ( a take-in/take-out door) at the rear side thereof, the volume of the container is longitudinally divided into six sections. As goods having a larger length and/or width should be placed under other goods to stabilize the load during delivery, the number (integer) of the sections is determined by dividing the length of the container by the length of a comparatively large good. In this embodiment, the moving direction of the container 301 is the same as the longitudinal direction of the goods. However, the present invention is not necessarily limited to this.

(Step S2): Determination of a sum of good length for assembling and storing.

The length of goods for assembly/storage is deliberately determined so that one assembly/storage line 303 can substantially store the quantity of goods which can be contained in one section of the container. Accordingly, as is shown in FIGS. 4(A) and 4(B), the goods which are stored on the assembly/storage line 303 (1) are to be loaded in the section (1) of the container 301. Similarly, the goods which are stored on the assembly/storage lines 303 (2), (3), (4) and (5) are to be consecutively loaded in the sections (2), (3), (4), and (5) of the container 301. Because there are no goods which are to be loaded in the section (6) of the container 301 (goods are divided into five groups), section (6) is left vacant.

(Step S3); Generation of diverting data.

Suppose that goods are ordered by 15 stores for delivery as shown in table 1. In table 1, the alphabetical letters a through g denote items of goods which are arranged in the order of lengths as shown in FIGS. 4 (A) and 4 (B). As is apparent from table 1, the order fluctuates widely by items.

TABLE 1

| Destination (Stores) | Goods | | | | | | | | 5 Sections | |
|---|---|---|---|---|---|---|---|---|---|---|
| | Order of length → | | | | | | | | | |
| | a | b | c | d | e | f | g | Total | No. | Pcs. |
| A  1 | 2 | 2 | 4 | 5 | 3 | 2 | 3 | 21 | (1) | 29 |
| ↓  2 | 0 | 1 | 2 | 1 | 1 | 0 | 1 | 6 | | |
| 3 | 1 | 1 | 1 | 0 | 0 | 0 | 0 | 3 | (2) | 27 |
| 4 | 3 | 4 | 2 | 3 | 3 | 3 | 3 | 21 | | |
| 5 | 2 | 1 | 1 | 1 | 3 | 0 | 3 | 11 | (3) | 31 |
| 6 | 1 | 2 | 0 | 1 | 0 | 1 | 0 | 5 | | |
| 7 | 0 | 1 | 2 | 2 | 4 | 4 | 0 | 13 | | |
| 8 | 1 | 1 | 2 | 3 | 2 | 1 | 2 | 12 | (4) | 30 |
| 9 | 1 | 0 | 1 | 1 | 0 | 1 | 1 | 5 | | |
| 10 | 2 | 0 | 3 | 1 | 3 | 2 | 1 | 12 | | |
| 11 | 0 | 5 | 1 | 1 | 1 | 1 | 1 | 10 | (5) | 28 |
| 12 | 0 | 2 | 0 | 1 | 2 | 2 | 0 | 7 | | |
| 13 | 2 | 2 | 1 | 2 | 1 | 1 | 0 | 9 | | |
| 14 | 1 | 1 | 2 | 1 | 2 | 0 | 0 | 7 | | |
| 15 | 1 | 1 | 0 | 0 | 0 | 1 | 0 | 3 | | |
| Sub Total | 17 | 24 | 22 | 23 | 25 | 19 | 15 | 145 | | 145 |

TABLE 1-continued

| Desti- nation (Stores) | Goods | | | | | | | | 5 Sections | |
|---|---|---|---|---|---|---|---|---|---|---|
| | Order of length → | | | | | | | | | |
| | a | b | c | d | e | f | g | Total | No. | Pcs. |
| . . . | | | | | | | | | . . . | |
| Grand Total | | | | | | | | | 3000 | |

A: Order of loading goods in the container (Reverse to delivery order).

To prepare diverting goods assembling data, first, the destinations or stores are rearranged in the order of loading while the goods are arranged in the order of length. Then, based on the table 1, for each store, from the first store or destination the quantity of an item of goods is multiplied with its length, and the resulting goods of each item are added to obtain the sum from the left to the right. When the sum almost reaches the length of one assembly/storage line, collection of data is suspended. The goods which have been counted by then are grouped as one group, and attached with a line number (1) for the goods grouped. The diverting data are prepared so that the particular group should be diverted to and stored on the line (1). In the above table 1, a total 145 pieces of goods for 15 stores or destinations are divided into five groups by taking into consideration the length of an assembly/storage line, volume of a container, delivery efficiency, and the like. That is, the group (1) which is divided into five includes 29 pieces of goods in total; 21 pcs. for the store No. 1, 6 pcs. for the store No. 2, and 2 pcs. for the store No. 3. Similarly, the group (2) which is divided into five includes 27 pieces of goods in total; 1 pcs. for the store No. 3, 21 pcs. for the store No. 4, and 5 pcs. for the store No. 5. Likewise, the group (3) which is divided into five includes 31 pieces of goods in total; 6 pcs. for the store No. 5, 5 pcs. for the store No. 6, 13 pcs. for the store No. 7, and 7 pcs. for the store No. 8. Similarly, the group (4) which is divided into five includes 30 pieces of goods in total; 5 pcs. for the store No. 8, 5 pcs. for the store No. 9, 12 pcs. for the store No. 10, and 8 pcs. for the store No. 11. Likewise, the group (5) which is divided into five includes 28 pieces of goods in total; 2 pcs. for the store No. 11, 7 pcs. for the store No. 12, 9 pcs. for the store No. 13, 7 pcs. for the store No. 14, and 3 pcs. for the store No. 15. The numbers of the five groups meet more or less the number of 30 pieces of goods.

The order listed in the table 1 is determined according to the number of destinations and the order of delivery for each container (one truck) by the host computer (CPU) 201.

(Step S4): Preparation of batch picking data.

As described above, a plurality of goods are arranged or assembled for each container and almost all the assembly/storage lines 303 are allocated with goods which are divided in the unit of one container. The total of the goods are then regarded as the whole picking volume. In other words, the number of goods on the assembly/storage lines becomes a picking number, which is 3000 in the above table 1. The number of goods is summed for all the containers in the unit of items. Picking data are then prepared in such a manner as to pick up the goods in the order of lengths.

Figure 5:
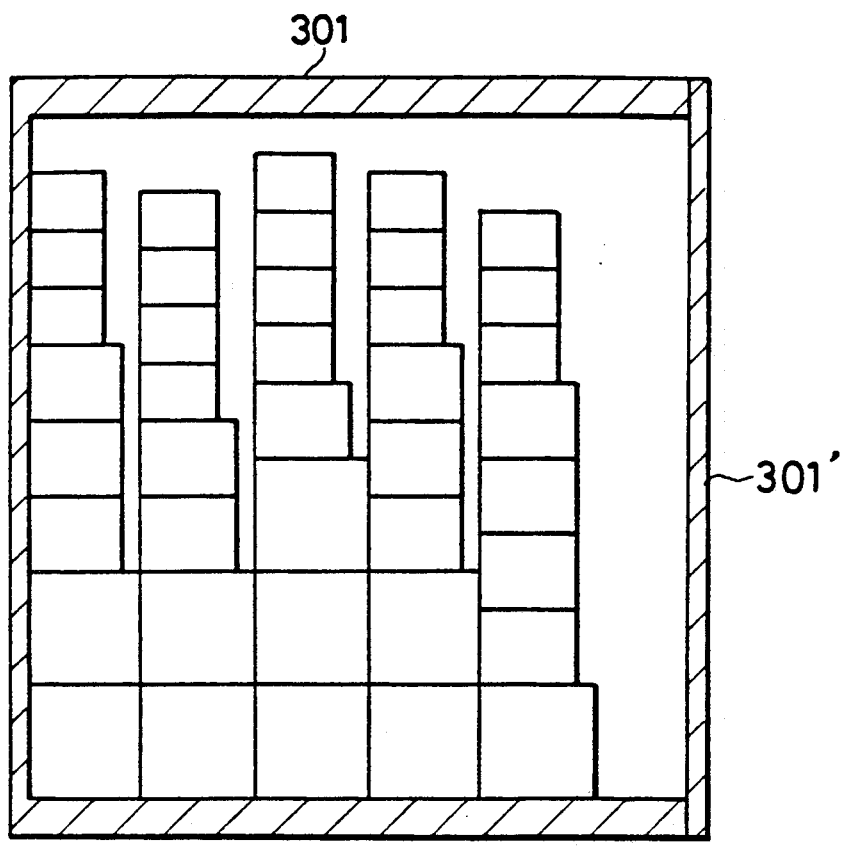
FIG. 5 is a schematic sectional view showing, in principle, a state of goods loaded in a container.

As described above, the container 301 is loaded with the goods in a predetermined state, one example of which is shown in principle in FIG. 5. In FIG. 5, reference numeral 301' denotes a door of the container.

The method according to the present invention offers the following advantages.

That is, data on a plurality of (occasionally singular) destinations for delivery as well as the order of delivery are calculated for each container (each truck) by the host computer (CPU) 201 and thereafter the above-mentioned calculation is processed by the physical distribution control computer 202 to generate a batch picking data, and based on such generated batch picking data, goods are picked up in batch thereby to pick up goods for a plurality of containers simultaneously at higher efficiency compared to the prior art picking method which was limited to one container volume.

Furthermore, the method according to the present invention enables storage of goods over the entire length of an assembly/storage line within the sectional volume of a container by determining the number of goods with the number of sections of the container. Therefore, compared to the prior art assembly/storage method which was limited to one store or destination, an excellent space efficiency can be obtained. In the example of the orders listed in table 1, as shown in FIGS. 4(A) and 4(B), goods are arranged in the order of length of items of goods a, b, c, d, e, f, and g.

According to the method of the present invention, goods are carried out from the assembly/storage line 303 (1) to be sequentially loaded in the section (1) of the container 301. In this manner, the goods intended for the stores No. 1 and 2 and a part of those intended for the store No. 3 are piled up in the unit of items. However, this will not bother a distributor (driver) at all because when he opens the door of the container he will find the goods in good order only if he distributes the goods which are to be delivered to the store Nos. 1 to 3 in the order of the store No. 3, the store No. 2, and then the store No. 1. That is, it never happens that the goods which are required to be distributed first are placed behind those which are required to be distributed afterwards nor the goods which are required to be distributed afterwards are placed before those which are required to be distributed first. Therefore, the driver can take out the goods in the correct order when he opens the door of the container. This achieves substantially the same effect as the goods are loaded in accordance with the stores. As a result, the distributor can efficiently unload the goods. In addition, because the distributor can have other workers load the goods beforehand, he can deliver the goods loaded in another container during that time. Thus, the distribution schedule for the distributor can be more effectively planned.

Next, one example of an apparatus for merging goods according to the present invention which is applied to the above-described physical distribution system as well as one example of a sorting apparatus which is applied to the physical distribution system together with the apparatus for merging goods according to the present invention will be described.

FIG. 6 is a plan view schematically showing one embodiment of an apparatus for merging goods according to the present invention. In the FIG., 1 denotes three sets of storage conveyors which constitute the storage line 102 of FIG. 1. On each of these storage conveyors 1, the goods which were picked up based on the afore-described batch picking data and temporarily stored are loaded one after another. A predetermined amount of such loaded goods form a unit of items which are to be successively carried out. Element 2 denotes three sets of carry-out conveyors mounted on the carry-out end of each storage conveyor 1 and adapted to carry out the goods in the unit of a lot (as merging unit) but by separating the goods into individual goods. Elements 3A and 3B denote merging conveyors which are disposed generally perpendicular to the carry-out conveyor 2 and adapted to convey the carried-out goods. The carry-out conveyors 2 and the merging conveyors 3A and 3B constitute the merging conveyor line 103 of FIG. 1 which is adapted to convey a predetermined amount of goods on each storage conveyor 1 in the unit of a merging lot to a line to follow. The merging conveyor 3B is disposed at angles passing through a floor pit FP provided on the floor as shown in FIG. 6 and is adapted to transfer the goods to a switching conveyor 4 (see FIG. 11) which is disposed downstream.

Figure 7A:
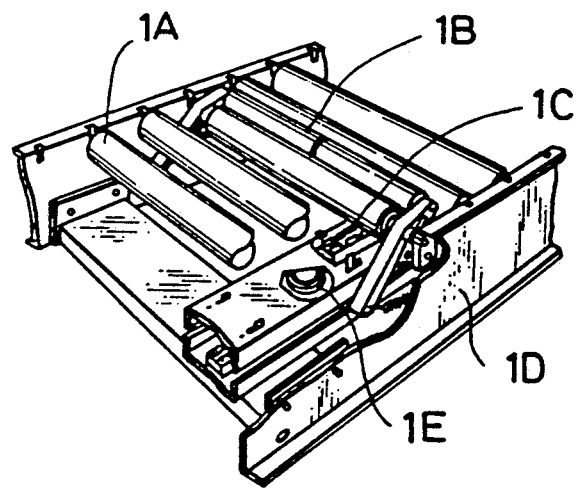
FIG. 7 (A) is a partly cut-away perspective view showing the important part of a storage conveyor thereof.
Figure 7B:
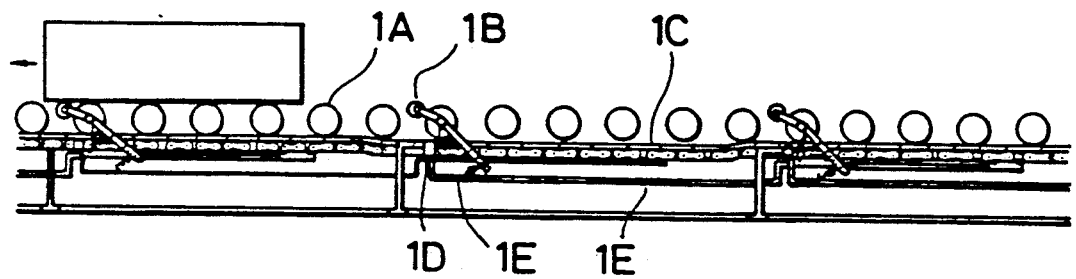

The various parts of an apparatus for merging goods according to one embodiment of the present invention will be described in detail. The storage conveyor 1 is constituted as an accumulation conveyor having an accumulation function and a singulation release function (a simultaneously carrying-out function). The storage conveyor 1 has a sufficient length (for example, 30 m) necessary for storing goods forming a unit of merging items which are to be consecutively carried out. That is, the storage conveyor 1, as shown in FIGS. 7(A) and 7(B), includes a plurality of carrier rollers 1A, a plurality of sensing rollers 1B each of which is provided for every required number of the carrier rollers 1A, a pad chain 1C for rotating the carrier rollers 1A by contacting thereto, a lifting mechanism comprising a mechanical valve 1D, and an air actuator 1E which are adapted to press the pad chain 1C against the carrier rollers 1A and to separate the pad chain 1C from the carrier rollers 1A, and a driving apparatus (not shown) with a speed changer for driving the pad chain 1C. The conveyor 1 also includes an air circuit (not shown) bypassing the mechanical valve 1d so that the goods can be released and carried out simultaneously. The rear end portion (about 5 m long) of the storage conveyor 1 is not provided with the sensing roller nor the lifting mechanism. At the rear end portion of the storage conveyor 1, the pad chain 1C is normally pressed against the carrier rollers 1A. Instead of the above-described accumulation conveyor, another type of conveyor as disclosed in the Japanese patent publication No. 58-27167 may be employed. In FIG. 7(B), the goods are represented by a square mark on the carrier rollers 1.

The carry-out conveyor 2, as shown in FIG. 8(A), is a conveyor of the type in which the goods are singulated and skewedly carried out. The conveyor 2 comprises belt feeders 2A and 2B, and a skewed merging conveyor 2C arranged in series with the belt feeders 2A and 2B. The skewed merging conveyor 2C includes driven skewed wheels 2d and free rollers 2E. The belt feeder 2B and the skewed merging conveyor 2C are driven at a higher speed than the belt feeder 2A. Instead of the skewed merging conveyor 2C, a curve conveyor may be employed. In FIG. 8(B), PH3 and PH4 denote photo-switches adapted to detect the completion of the carry-out of the goods.

The merging conveyor 3A in the merging apparatus comprises a roller conveyor, and the merging conveyor 3B comprises a belt conveyor. These merging conveyors 3A and 3B are driven at the same speed as the skewed merging conveyor 2C.

In FIG. 6, 31 denotes a carrier storage conveyor which is adapted to convey and temporarily store the goods which were picked up. The carrier storage conveyor 31 comprises an accumulation conveyor similar to the storage conveyor 1. This carrier storage conveyor 31 is not necessarily required to have the function to release sigulation and carry out goods simultaneously.

Figure 9:
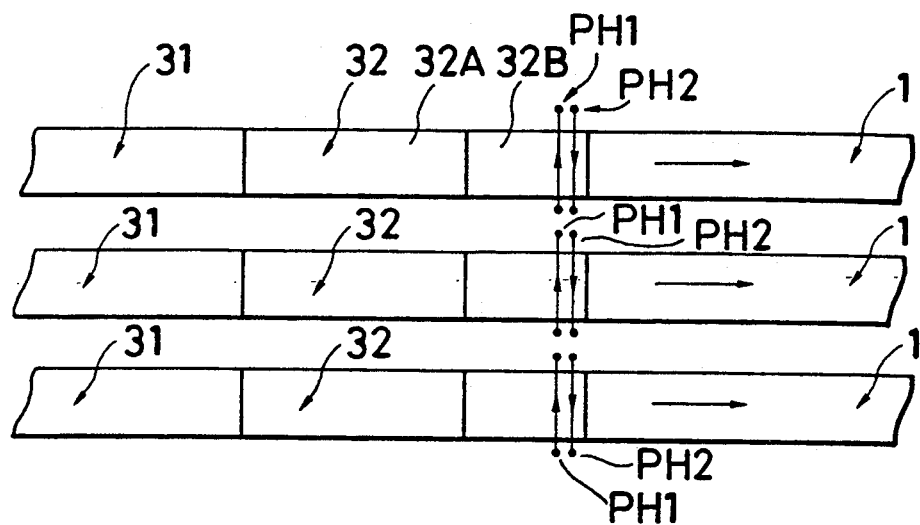
FIG. 9 (A) is a plan view showing a counting apparatus thereof.
Figure 9B:
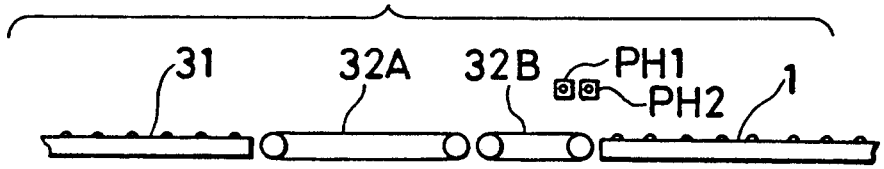

In FIG. 6, 32 denotes a goods counting apparatus. As shown in FIGS. 9(A) and 9(B), the goods counting apparatus 32 comprises belt conveyors 32A and 32B, and photo-switches PH1 and PH2. Because the belt conveyor 32A is driven at a higher speed than the carrier storage conveyor 31 and the belt conveyor 32B is driven at a higher speed than the belt conveyor 32A, the goods which are being conveyed can be singulated and counted by the photo-switches PH1 and PH2. The belt conveyors 32A and 32B are driven by a motor with a brake (not shown), respectively.

As the counting apparatus 32, such an apparatus as shown in FIG. 10 may be used. The counting apparatus 32 of FIG. 10 is constituted in the same manner as the embodiment of FIG. 9 except that the former is provided with an item checking apparatus 32C for checking the item of goods generally at the same time when the goods are counted. The item checking apparatus 32C comprises a gate type frame including photo-switches PH5 and PH6 on both lower ends thereof, and a power cylinder for lifting the gate type frame. The power cylinder includes an encoder. One side wall of the gate type frame is provided with a dog 32C' for two limit switches (not shown) for detecting the limit position of the lifting movement of the gate type frame. Instead of the photo-switches PH5 and PH6, there may be employed such apparatuses as an outer configuration detecting apparatus for detecting the outer configuration by means of a pattern recognition, a height detecting apparatus by means of supersonic waves, a length detecting apparatus by means of shading time of a photo-switch, an item detecting apparatus using a bar code, and a weight detecting apparatus by means of a load cell.

Figure 11A:
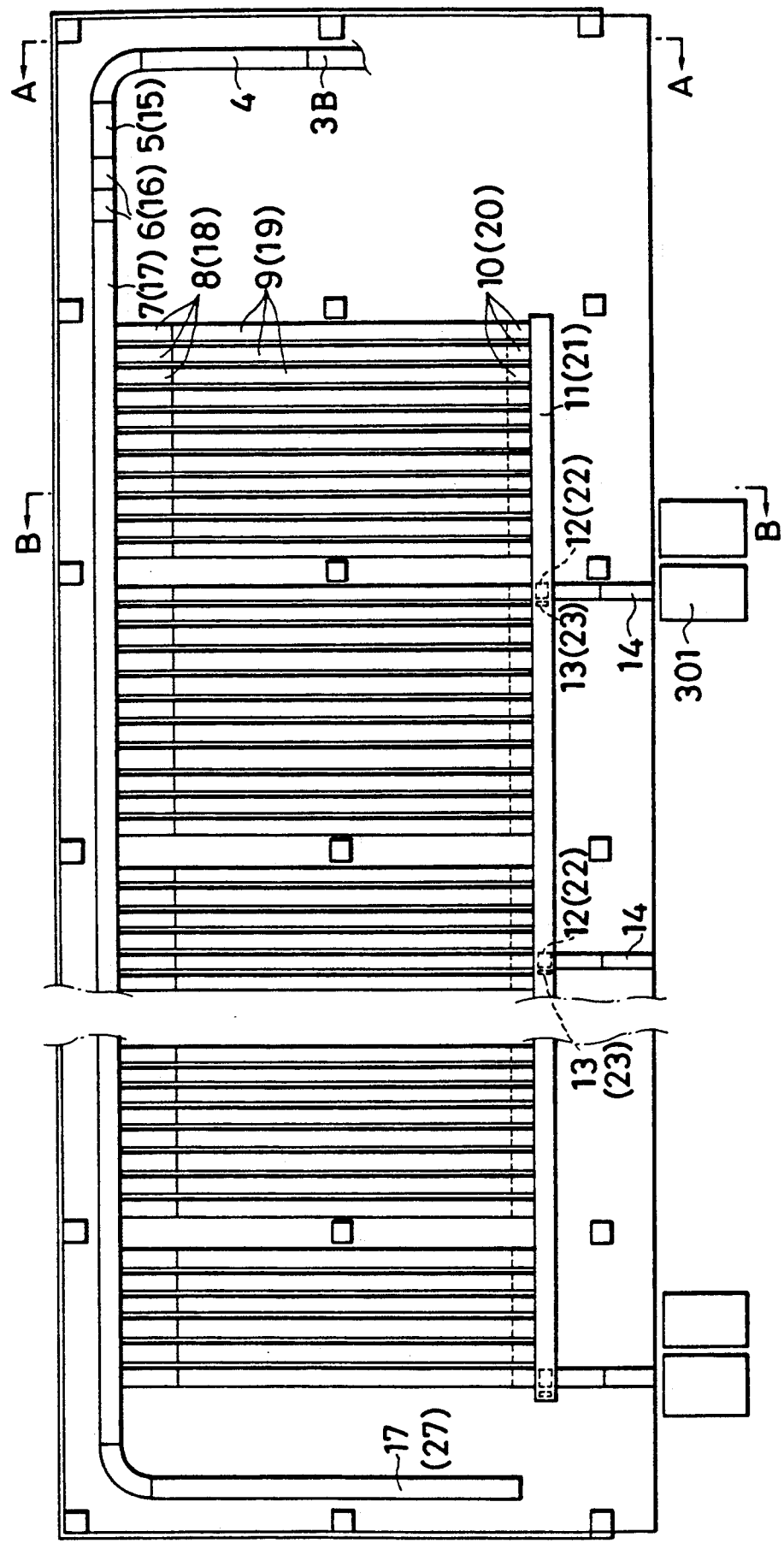
FIG. 11 (A) is a plan view schematically showing one example of a sorting apparatus.

FIG. 11(A) is a plan view schematically showing one example of a goods sorting apparatus which constitutes the physical distribution system together with the apparatus for merging goods according to the present invention. FIG. 11(B) is a sectional view taken along line A—A of FIG. 11(A), and FIG. 11(C) is a side view taken along line B—B of FIG. 11(A). The goods sorting apparatus of this example is disposed downstream of the goods merging apparatus of the present invention. In these figures, 4 denotes a switching conveyor. As shown in FIG. 11(B), the right end of the switching conveyor 4 moves up and down to convey goods to either carrier conveyor 5 or 15, the carrier conveyors 5 and 15 being horizontally disposed in vertically parallel relation or in two layers. When viewed from above as in the case with FIG. 11(A), of those conveyors in two layers, the ones in the lower layer cannot be seen. Therefore, the conveyors in the lower layer are denoted by the same reference numerals to those for the conveyors in the upper layers but the reference numerals denoting the conveyors in the lower layer are placed in parentheses and shown in the vicinity of the corresponding reference numerals without parentheses.

In FIGS. 11(A) through 11(C), 6 and 16 denote index feeders for providing a predetermined space between adjacent goods which have been conveyed on the carrier conveyors 5 and 15 via the switching conveyor 4. Elements 7 and 17 denote diverting conveyors which constitute the diverting or sorting line 104 of FIG. 1 including a diverting apparatus. The diverting conveyors 7 and 17 are adapted to divert goods based on the diverting or sorting group data into a plurality of lead-in conveyors 8 and 18 which are disposed generally perpendicular to the diverting conveyors 7 and 17. Elements 9 and 19 denote inclined roller conveyors which constitute the assembly/storage line 105 of FIG. 1. The inclined roller conveyors 9 and 19 are adapted to allow the goods, which have been transferred by the lead-in conveyors 8 and 18, to advance by their own gravity on the slope to be assembled and stored.

Elements 10 and 20 denote carry-out apparatuses which constitute the carry-out line 106 of FIG. 1. In the carry-out apparatuses 10 and 20, when a container identification number (truck number) is specified, the stopper means is released to carry out goods in the unit of the container for each line (see FIGS. 13(A) and 13(B)). Elements 11 and 21 denote carrier conveyors which constitute the carry-out line 106 of FIG. 1 together with the carry-out apparatuses 10 and 20. The carrier conveyors 11 and 21 are adapted to convey the goods which have been carried out by the carry-out apparatuses 10 and 20 to a loading station for a container. Element 12 and 22 denote transfer feeders, and 13 and 23 denote stoppers. The goods which have been transferred to the loading station for a container are further transferred to a loading conveyor 14 (which corresponds to the container loader 302 of FIG. 4), which constitutes the conveyor line 107 of FIG. 1, by the transfer feeders 12 and 22 and the stoppers 13 and 23. Between the upper carrier conveyor 11 and loading conveyor 14, a switching chute 14A is disposed as shown in FIG. 11(C) in a manner when the goods are carried out from the upper carrier conveyor 11, the chute 14A is lowered to be connected and when goods are carried out from the lower conveyor 21, the chute 14A is raised to be disconnected at the position shown by broken lines. The goods are transferred from the loading conveyor 14 to the container 301 by workers.

In FIG. 11(A), the overflow lines 26 and 27 shown in the left side are adapted to store goods which cannot be diverted if no diverting data are supplied.

Next, one embodiment of a method for merging goods according to the present invention which is carried out using the apparatus for merging goods according to the present invention shown in FIGS. 6 through 10 will be described.

The goods which have been picked up based on the afore-described batch picking data by the picking equipment (not shown) disposed upstream of the carrier storage conveyor 31 are conveyed to the counting apparatus 32 by the carrier storage conveyor 31. In the case where the goods are loaded on the storage conveyor 1 (the carrying-out of the goods on the storage conveyor 1 has not been completed yet), because the belt conveyors 32A and 32B of the counting apparatus 32 are being stopped when the first goods arrive at the counting apparatus 32, such goods are stored on the carrier storage conveyor 31 without any space between adjacent goods. When the carrying-out of the goods on the storage conveyor 1 has been completed, the belt conveyors 32A and 32B are driven, and the goods on the carrier storage conveyor 31 are stored on the storage conveyor 1 while being counted by the photo-switches PH1 and PH2. In the case where goods are not loaded on the storage conveyor 1, because the belt conveyors 32A and 32B are driven when goods arrive at the counting apparatus 32, the goods are stored on the storage conveyor 1 while being counted by the counting apparatus 32.

Figure 9C:
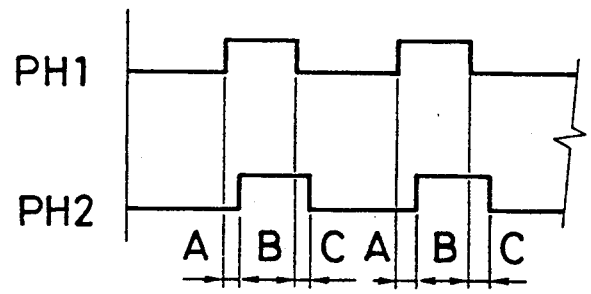

Since the belt conveyors 32A and 32B of the counting apparatus 32 are driven at the speed as shown in table 2, the goods can be singulated and counted by the photo-switches PH1 and PH2. That is, as shown in FIG. 9(C), when the photo-switches PH1 and PH2 are shaded in the order of A, B, and C, they count as "one piece of goods has passed". The counted goods are conveyed to and stored on the storage conveyor 1. When a predetermined number of goods have passed (counted) based on the batch picking data and the photo-switches PH1 and PH2 become the state in which light can enter, the belt conveyors 32A and 32B are stopped and the next succeeding goods are stored on the carrier storage conveyor 31.

TABLE 2

| Item of Conveyors | Conveying Speed |
| --- | --- |
| Carrier Storage Conveyor 31 | 20 m/min. |
| Belt Conveyor 32A | 25 |
| Belt Conveyor 32B | 40 |
| Storage Conveyor 1 | When storing: |
| | 33.8 |
| | When carrying out: |
| | 21.2/25.2/28.4/33.8 |
| Belt Feeder 2A | 35 |
| Belt Feeder 2B | 50 |
| Skewed Merging Conveyor 2C | 50 |
| Merging Conveyor 3A | 50 |
| Merging Conveyor 3B | 50 |

In the case where the method is carried out using a counting apparatus 32 including an item checking apparatus 32C as shown in FIG. 10, the goods are counted and almost simultaneously checked with the item thereof by moving the photo-switches PH5 and PH6 to predetermined heights (for example, with reference to the height of goods as shown in FIG. 10(D), the photo-switch PH5 is moved to a position lower than the reference height by about 5 mm, while the photo-switch PH6 is moved to a position higher than the reference height by about 15 mm) based on the batch picking data including such data such as the order of conveying goods, number of conveying goods, and outer dimension of the goods. That is, the power cylinder is detected with the lifting amount by means of counting a pulse of the encoder and is stopped when the detected result conforms to the outer dimension of the goods based on the batch picking data. In this embodiment, the power cylinder is stopped when the detected result conforms to a command signal showing the height of the goods. With the power cylinder controlled in the manner as described, when goods are brought to the position of the photo-switch PH1 and when the photo-switch 1 is shaded, the system is normal if the photo-switch PH5 is shaded and the photo-switch PH6 can allow light to enter. Therefore, the goods are counted by the photo-switches PH1 and PH2 and conveyed to the storage conveyor 1. When something abnormal with the items is detected by the photo-switches PH5 and PH6, the belt conveyors 32A and 32B are stopped. In other words, the goods which are being conveyed are counted and almost at the same time the counted value is checked to determine whether it conforms to the outer dimensions of the goods with reference to the conveying goods data, and as a result, when they are detected as "not conformed", the belt conveyors 32A and 32B are stopped. When the counting of a certain item has been completed, the photo-switches PH5 and PH6 are lifted to the height of the following goods by the power cylinder. If the following goods arrive before the lifting has been completed to shade the photo-switch PH1, the belt conveyors 32A and 32B are immediately stopped. After the lifting has been completed, the belt conveyors 32A and 32B are driven again. In the above description, all goods are checked with the item. However, only the first and last goods of each group of the goods which are flowing in succession may be checked with generally the same result as in the case where all of the goods are checked. Therefore, in the case where another item checking apparatus having a comparatively low processing capacity for calculation is used instead of the photo-switches PH5 and PH6, all of the goods are not necessarily checked. When the goods which have passed the counting apparatus 32 reach the storage conveyor 1, they are stored thereon without leaving any space between adjacent goods since the carry-out conveyor 2 is stopped. The storing is completed when the goods have been stored generally over the entire length of the storage conveyor 1, i.e., when a unit of merging items comprising a predetermined number of goods have been formed on the storage conveyor 1. In this case, the completion of the storage of the goods means that based on the data on the storage length from the batch picking data, the time required for storing the goods including the first goods to the last goods without any space between adjacent goods after the last goods have passed the photo-switch PH2 (i.e., after the photo-switch PH2 returned to its position for allowing light to enter) was counted by a controlling apparatus (not shown), the last goods passed the photo-switch PH2, and the time has passed, i.e., all goods have been stored without any space between adjacent goods. The belt feeders 2A and 2B are driven when the last item is counted. The belt feeders 2A and 2B are stopped when the first item arrives at the photo-switch PH3. In this way, the items are now ready to be carried out.

In this embodiment, when batch picking data in step S4 is prepared, the whole container portion is totaled for each item, and goods are picked up in the order of length thereof, and goods are sectioned for each amount whenever the goods have been loaded generally over the entire length of the storage conveyor 1 to form a unit of merging items. Therefore, one unit of merging items usually comprises a plurality of items, although there is a case where the unit of items comprises only one item. Because the unit of merging items usually comprises a plurality of items, the switching frequency for merging becomes less compared with the case where goods are merged for each unit of items. Thus, a time loss for switching can be reduced. As a result, a merging capacity can be increased without increasing the conveying speed of goods when the goods are merged.

Whenever a predetermined number of goods forming a unit of items are stored on the storage conveyor 1, they are carried out in the order of completion of the storage. The storage conveyor 1 is changeable in speed in four stages and suitably changed its carrying-out speed according to the dimensions of the goods. More specifically, it is divided into four sections in the goods conveying direction according to the various lengths of the goods, i.e., less than 330 mm, from 330 mm to 390 mm, from 390 mm to 530 mm, and 530 mm or more. The goods carrying-out speeds become 21.2 m/min., 25.5 m/min., 28.4 m/min., and 33.8 m/min. corresponding to each section of the goods. By changing the carry-out speed of the goods in this way, the space between adjacent goods which are being carried out can be arranged generally constant irrespective of the dimensions of the goods. Accordingly, the number of the goods which are carried out for a unit time can be made generally constant. When the goods stored on the storage conveyor 1 are in the range of a plurality of sections, the carrying-out speed is changed according to the section including the smaller goods. However, as already described with respect to step S4, since the goods are conveyed in the order of length, the goods are usually included in a section within the dimensions of one good. Before the carry-out conveyor 2 starts the carrying-out of the goods to the merging conveyor 3A, the predetermined speed of the storage conveyor 1 is changed based on the batch picking data. Upon starting of the carry-out conveyor 2, the goods on the storage conveyor 1 are consecutively carried out (all goods are simultaneously advanced using the singulation release function) on the carry-out conveyor 2 without any space between adjacent goods. The goods are singulated, accelerated and carried out on the merging conveyor 3A by the carry-out conveyor 2. In this case, the goods are skewed by the skewed merging conveyor 2C and carried out on the merging conveyor 3A. By simultaneously carrying out the goods on the storage conveyor 1 as described, unevenness of the carry-out pitch of the goods can be made small. When the carrying-out of the goods on the storage conveyor 1 has been completed, the storage conveyor 1 is changed into the maximum speed of 33.8 m/min. (the speed remains unchanged if the carrying-out is performed at this speed) to be ready for storing the following goods. The completion of the carrying-out of the goods is known by determining that the photo-switch PH4 corresponding to the carrying-out storage conveyor 1 is in the state where light is allowed to enter therein when the photo-switch PH3 is in the state where light is allowed to enter therein for two seconds continuously.

In order to prevent the goods from colliding against one another when the goods are carried out from the succeeding storage conveyor 1 after the carrying-out of the goods from one storage conveyor 1 has been completed, the starting time of the carrying-out of the goods is adequately controlled. That is, when the carrying-out of the goods from the storage conveyor 1 to be merged to the downstream side of the merging conveyor 3A has been completed and the carrying-out of the goods from the storage conveyor 1 to be merged to the upstream side of the merging conveyor 3A is started, the next following carrying-out is started at the same time the carrying-out has been completed (when the photo-switch PH3 is in the state where light is allowed to enter therein for two seconds continuously, the other photo-switch PH4 is in the state where light is allowed to enter therein). When the carrying-out of the goods from the storage conveyor 1 to be merged to the upstream side of the merging conveyor 3A has been completed and the carrying-out of the goods from the storage conveyor 1 to be merged to the downstream side of the merging conveyor 3A is started, the following carrying-out is started when the photo-switch PH4 corresponding to the storage conveyor 1 from which the goods are carried out next becomes the state where light is allowed to enter therein after a predetermined time (the time required for carrying out goods to reach the photo-switch PH4 corresponding to the storage from which the goods are carried out next) has passed after the carrying-out had been completed. Therefore, in this embodiment, the required time from the completion of the carrying-out of goods to the start of the carrying-out of the next goods becomes as shown in table 3 listed hereunder.

TABLE 3

| The order of switching for merging | Time from the completion of carry-out to start of the next following carry-out |
|---|---|
| When switching from downstream side to upstream side | 2 seconds |
| When switching from upstream side to downstream side | 2 seconds + 1.2 seconds = 3.2 seconds |
| When switching from upstream side to downstream side by two pieces | 2 seconds + 2.4 seconds = 4.4 seconds |

The merging conveyor 3A is 50 m/min., and if the arranging pitch of the storage conveyor 1 is 1 m, since it takes 1.2 seconds for a goods to be conveyed for 1 m and 2.4 seconds for a goods to be conveyed for 2 m, the required time becomes as stated above.

Next, the sorting of goods or moving operation by means of the sorting apparatus will be described and at the same time the sorting apparatus will be described in detail.

Figure 12:
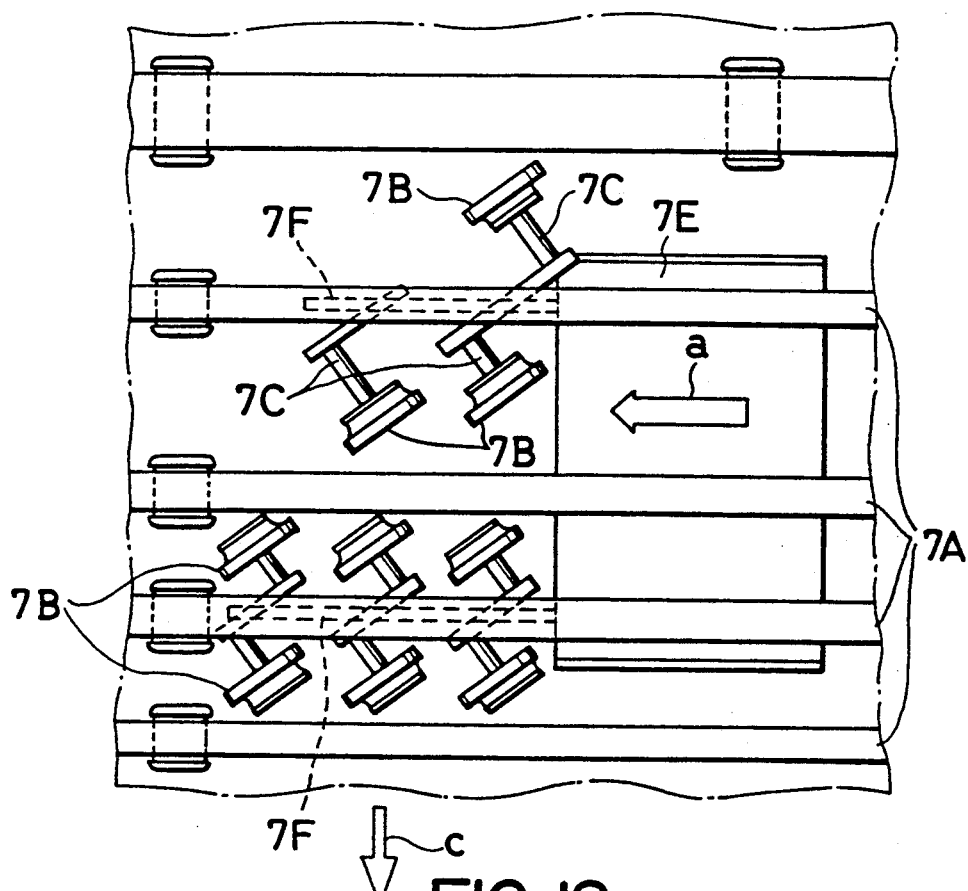
FIG. 12 (A) is a plan view showing an important part for explaining the action of a diverting conveyor thereof.
Figure 12:
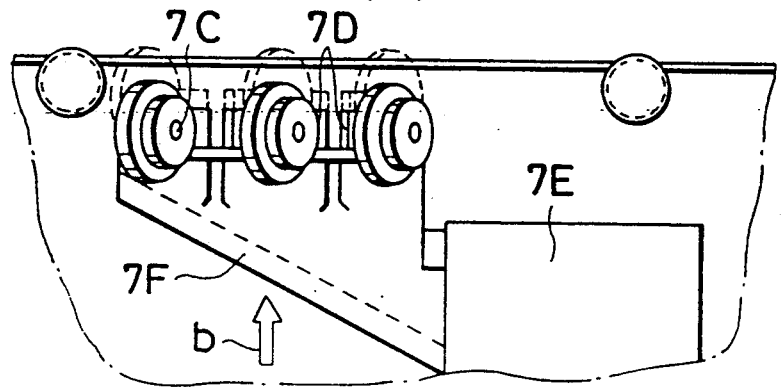

FIGS. 12(A) and 12(B) are illustrations for explaining the action of diverting conveyors 7 and (17), wherein FIG. 12(A) is a plan view and FIG. 12(B) is a front view. In FIGS. 12(A) and 12(B), a plurality of conveyors 7A transfer goods (not shown) in the direction as shown by an arrow a. In predetermined positions between adjacent conveyor belts 7A, a purality of skewed wheels 7B are provided each with the rotary shaft 7C disposed at predetermined angles with respect to the advancing axis of the conveyor belt 7A. The rotary shaft 7C is supported by a bracket 7D so that the skewed wheel 7B can rotate freely. The bracket 7D is supported by a pop-up device 7E through an arm 7F. One set of the diverting conveyors 7 and (17) are provided to each of the plurality of lead-in conveyors 8 and (18) shown in FIG. 11(A).

According to the commands from the afore-mentioned diverting data, the diverting conveyors 7 and (17) for the required lead-in conveyors 8 and (18) move goods in the direction as shown by an arrow c and transfer the same to a lead-in conveyor (not shown), because the skewed wheels are pushed up, by the pop-up device 7E. in the direction as shown by an arrow b and brought to the positions shown by the broken lines in FIG. 12(B).

Figure 13A:
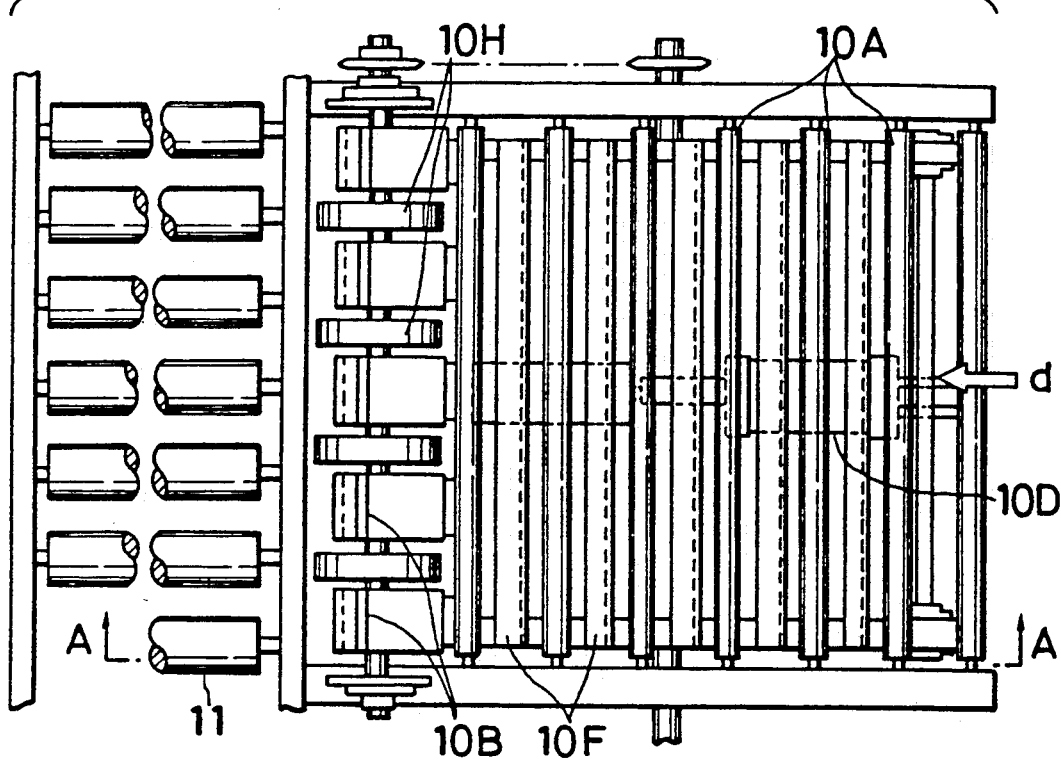
FIG. 13 (A) is a plan view for explaining the action of a carrying-out apparatus thereof.
Figure 13B:
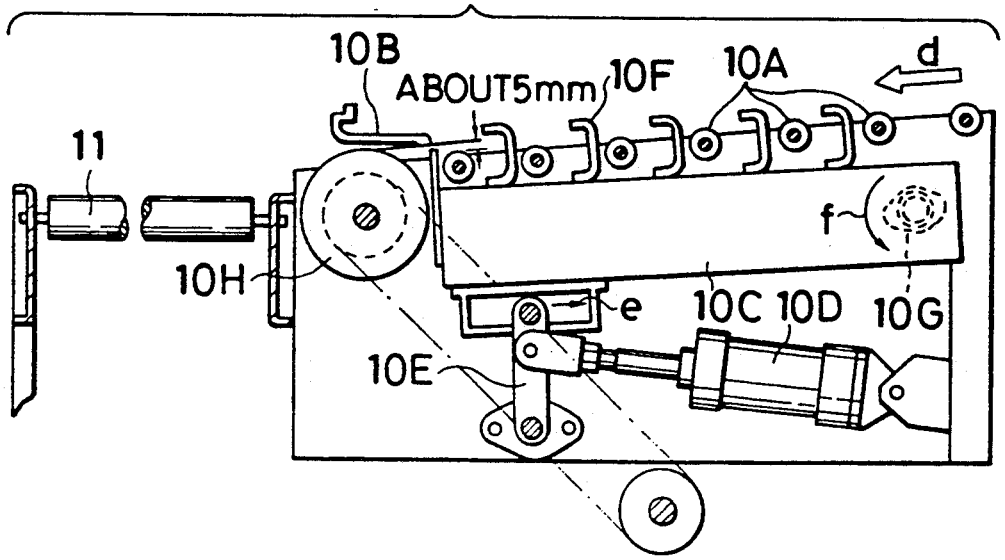

FIGS. 13(A) and 13(B) are illustrations for explaining the action of the carry-out apparatuses 10 (20) of FIG. 11 adapted to carry out goods which are stored on the assembly/storage line 105 of FIG. 1, wherein FIG. 13(A) is a plan view and FIG. 13(B) is a sectional view taken along the line A—A of FIG. 13(A).

In FIG. 13(B), goods unshown are self-advanced on the free rollers 10A in the direction as shown by an arrow d. However, the goods are normally stopped from advancing because a lever 10E is positioned in the generally vertical direction to push up a frame 10C by a carry-out cylinder 10D and therefore a stopper 10B and a plurality of lifting channels 10F are kept at positions above the top surface of each free roller 10A.

When a predetermined signal is input, the cylinder 10D causes the lever 10E to turn in the direction as shown by an arrow e. As a result, because the frame 10C is caused to turn about a shaft 10G in the direction as shown by an arrow f, the stopper 10B and the lifting channels 10F are lower than the top surface of each free roller 10A. Due to the foregoing, the goods (unshown) resume the self-advance and are transferred to the carrier conveyors 11 (21) by a drive wheel 10H.

Figure 14:
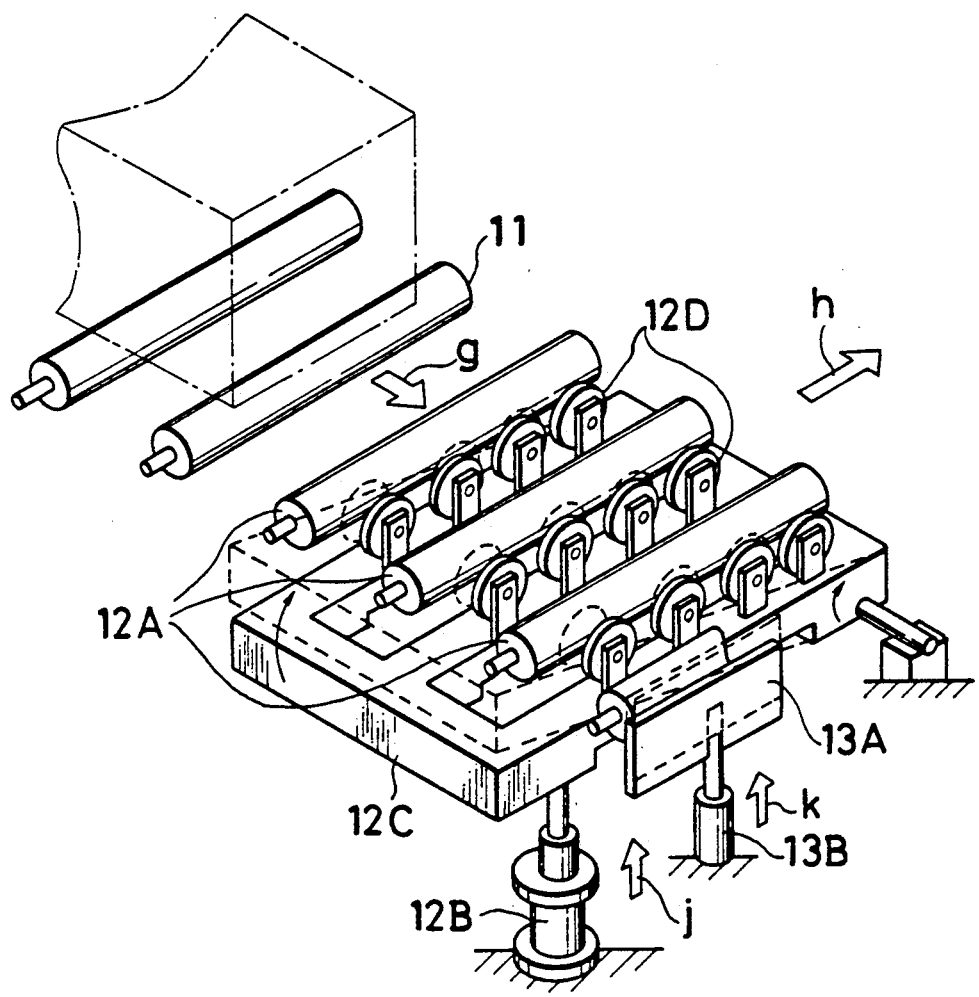
FIG. 14 is a perspective view of an important part for explaining how a transfer and a stopper thereof act.

FIG. 14 is an illustration for explaining the action of the transfer feeders 12 and (22) and the stoppers 13 and (23) of FIG. 11 which are adapted to transfer goods (shown by one dot chain lines), which have been installed on the carrier conveyors 11 and (21) to be transferred in the direction as shown by an arrow g, onto the loading conveyor 14 (in the case of an upper loading conveyor 14, the goods are transferred thereon through a switching chute) of FIG. 11 which is disposed in the direction as shown by an arrow h. When the goods are not transferred, as the transfer cylinder 12B and the stopper cylinder 13B are not actuated, the upper ends of a plurality of wheels 12D on a frame 12C and the upper end of a stopper plate 13A are brought to be lower than the top surfaces of drive rollers 12A. Therefore, the goods passing over the wheels 12D and stopper plate 13A are advanced in the direction as shown by an arrow g. When a signal for transferring the goods is input, since a transfer cylinder 12B and a stopper cylinder 13B are actuated in the directions as shown by arrows j and k, respectively, to push up the wheels 12D and the stopper plate 13A and bring them to the positions shown by the broken lines, the goods are transferred in the direction as shown by an arrow h.

The features and advantages of the above-described embodiments of the method for merging goods according to the present invention as well as the above-described embodiments of the apparatus for merging goods according to the present invention are as follows:

(i) A unit of items is formed by each group of goods which are loaded generally over the entire length of a storage line. After the lot of goods forming one unit of items have been stored on the storage line, the goods are merged. In addition, because the unit of merging items is made large by making the storage line comparatively large and one unit of merging items usually comprises different items of goods, the frequency for switching for merging is less compared with the case where goods are merged as one unit of same item of goods, thus reducing a time loss for switching.

For example, in the case where 3000 pieces of goods (average length: 0.4 m) in total comprising 500 different items of goods are merged in turn using three pieces of storage line having a 30 m length, the time loss for switching is 112 seconds (switching times are 40) in total as shown in table 3, whereas in the case where the switching is performed for each item of goods, the time loss for switching becomes 1400 seconds (switching times are 500) in total. Therefore, in the case where 3000 pieces of goods are merged in one hour (3600 seconds), the time loss ratios for switching become 3% and 39%, respectively.

Accordingly, in the above-described embodiments, the merging capacity can be increased without increasing the conveying speed of goods when the goods are merged.

(ii) Because goods are stored on a storage line after the goods are counted, the goods can be counted comparatively slowly, thus reducing counting errors.

For example, in the case where 3000 pieces of goods are merged in turn in one hour using three pieces of storage line, the goods can be counted as slowly as about 1000 pcs./hr and carried out and merged at the speed of 3000 pcs./hr., whereas in the case where a counting apparatus is located in the vicinity of the merging portion, the goods must be counted as fast as 3000 pcs./hr., thus often resulting in counting errors.

Accordingly, in the above-described embodiments, the counting errors can be reduced, goods can be chased correctly, and goods can be merged at a high speed without decreasing the merging speed.

(iii) Because the conveying speed of goods can be changed in speed according to the sizes of the goods when the goods are carried out from a storage line, a conveying space between adjacent goods after they are merged can be maintained generally constant.

If the carrying-out speed of goods is maintained constant, the conveying speed of the goods after merging becomes as follows:

$$P = L + C$$

where: P is a conveying pitch, L is the size (length) of goods, and C is a space between adjacent goods.

Accordingly, the conveying pitch P is changed due to the size L of goods (C is a variable which varies in proportion to the size L of the goods). In this case, if the space C between adjacent goods exceeds the sorting capacity of a diverting conveyor for diverting the merged goods, a conveying space controlling means must be provided before the diverting conveyor, thus complicating the physical distribution system as a whole.

In the above-described embodiment, since the goods can be merged with a constant space maintained between adjacent goods according to the capacity of the diverting conveyor, the sorting capacity of the diverting conveyor can always be manifested.

(iv) In goods which are checked with the item generally at the same time the goods are counted, picking errors of the goods by a picking apparatus and slipping of items due to counting errors can be detected and data can be corrected before the goods are merged or sorted, thus preventing many sorting errors to occur.

Accordingly, in the above-described embodiments, chasing errors of goods can almost totally be eliminated.

Although a method for merging goods and an apparatus therefor according to the present invention has been described in the form of embodiments, the present invention is not limited to these. For example, the storage line 102 is not necessarily required to be three pieces. Although the storage line 102 is disposed above and the assembly/storage line 105 is disposed thereunder, these lines may be disposed at the same level.

As described in the foregoing, according to a method for merging goods and an apparatus therefor of the present invention, even in the case where various items of goods are merged, a time loss which occurs when the switching for merging is performed can be reduced, thereby merging the goods efficiently and rapidly.

Furthermore, according to a method for merging goods and an apparatus therefor of the present invention, goods can be merged at a high speed without counting errors occurring, thereby merging the goods efficiently and rapidly.

In addition, according to a method for merging goods and an apparatus therefor of the present invention, even in the case where various items of goods are merged, a conveying space between adjacent goods after they are merged can be maintained generally constant, to thereby merge the goods efficiently and rapidly.

What is claimed is:

1. A method of merging goods in a physical distribution system prior to sorting and diverting said goods, comprising the steps of:
   (a) picking a unit of goods according to predetermined batch picking data;
   (b) counting a number of goods in each unit;
   (c) storing goods as a unit, wherein one unit is stored on a single one of a plurality of storage lines;
   (d) merging units of goods from each of said plurality of storage lines by changing a speed of carrying out goods from each of said plurality of storage lines according to a size of goods arranged thereon; and
   (e) sorting said goods into a plurality of groups based on predetermined dimension data.

2. A method for merging goods comprising the steps of:
   (a) forming a unit of goods according to size onto each of a plurality of conveyor lines, said unit of goods including a plurality of different items arranged in a predetermined order;
   (b) sequentially feeding a unit of goods from each of said plurality of conveyor lines in the order of completion of storage of said unit of goods on each of said plurality of storage lines only after said unit of goods has been stored on each of said plurality of storage lines;
   (c) changing a speed of carrying out goods from each of said plurality of storage lines according to a size of items arranged thereon; and
   (d) merging each of said sequentially carried out unit of goods from each of said plurality of storage lines onto a merging conveyor, whereby said method for merging reduces time loss which is taking place during a switching action for merging goods.

3. A method for merging goods according to claim 2, wherein said plurality of different items are selected and arranged according to size.

4. A method for merging goods according to claim 2, wherein said step of changing a speed is so that a conveying pitch of goods after merging will be generally constant regardless of the sizes of the items forming the unit of goods.

5. A method for merging goods according to claim 2, wherein said step of changing a speed is by a speed changing apparatus for changing the speed of carrying out goods to a merging conveyor from each storage line.

* * * * *